United States Patent
Wada

[11] Patent Number: 5,163,619
[45] Date of Patent: Nov. 17, 1992

[54] WASHER NOZZLE

[75] Inventor: Yoshiharu Wada, Yokohama, Japan

[73] Assignee: Jidosha Denki Kogyo K.K., Yokohama, Japan

[21] Appl. No.: 633,856

[22] Filed: Dec. 26, 1990

[30] Foreign Application Priority Data

Dec. 28, 1989 [JP] Japan .................. 1-151193[U]

[51] Int. Cl.⁵ .................. B05B 1/10; B60S 1/46
[52] U.S. Cl. .................................. 239/284.1
[58] Field of Search .......... 239/284.1, 284.2, 600; 285/214, 216, 194

[56] References Cited

U.S. PATENT DOCUMENTS

| | | | |
|---|---|---|---|
| 3,192,090 | 6/1965 | Sarafinas et al. | 239/284.1 |
| 3,237,866 | 3/1966 | Lovell | 239/284.1 |
| 3,386,663 | 6/1968 | Mandy et al. | 239/284.1 |
| 4,088,269 | 5/1978 | Schlick | 239/284.1 |
| 4,212,425 | 7/1980 | Schlick | 239/284.1 |
| 4,981,310 | 1/1991 | Belisaire | 285/194 |

Primary Examiner—Andres Kashnikow
Assistant Examiner—Lesley D. Morris
Attorney, Agent, or Firm—Sughrue, Mion, Zinn, Macpeak & Seas

[57] ABSTRACT

A washer nozzle is provided with a pair of clicks protruding in the opposite directions for engaging to a vehicle body and a wedge-shaped projection overhanging in the direction in the intersecting at right angles to the protruding direction of the clicks for being pressed against the vehicle body to a cyclindrical part forming a part of the washer nozzle, and possible to be fixed on the vehicle body securely because it is restricted in the both directions intersecting perpendicularly each other.

1 Claim, 4 Drawing Sheets

WASHER NOZZLE

BACKGROUND OF THE INVENTION

1. Field of the Invention

This invention relates to a washer nozzle used for cleaning a glass surface of, for example, a windshield, a head lamp or a mirror of a motor vehicle with a washing agent in order to remove stains such as dust, mud and so on.

2. Description of the Prior Art

Heretofore, there has been used a washer nozzle shown in FIG. 4 and FIG. 5, for example.

A washer nozzle 100 shown in the figures is provided with an outlet 103a for a washing agent in a nozzle holder 103 having a nearly hemispherical shape and forming a part of a nozzle case 102, and is provided with an inlet 104a for the washing agent in a cylindrical part 104 having pipe-like shape, forming another part of the nozzle case 102 and extending downwardly from the nozzle holder 103 in FIG. 4.

A nozzle body 101 formed with a jet 101a, is retained in the outlet 103a of the nozzle holder 103.

The cylindrical part 104 is provided with clicks 104b and 104c for engaging respectively to a nozzle fitting part 50a which is an opening cut through a vehicle panel 50 at positions opposed each other in FIG. 4.

The nozzle fitting part 50a is formed from a circular hole 50b having an inner diameter slightly larger than the outer diameter of the cylindrical part 104 and a rectangular hole 50c extending in the left and right directions from the circular hole 50b in FIG. 5.

A rubber damper sheet 105 is fitted on the lower surface of the nozzle holder 103 around the cylindrical part 104 in FIG. 4, and the washer nozzle 100 is fixed to the vehicle panel 50 at a state in which the nozzle holder 103 stands out on the upper side of the vehicle panel 50 by forcing the cylindrical part 104 into the nozzle fitting part 50a from upward to downward in FIG. 4 and engaging the respective clicks 104b and 104c with respective end walls 50d of the rectangular hole 50c.

The cylindrical part 104 is connected with a feed pipe for feeding the washing agent in a communicating state with the inlet 104a, so that the washing agent fed through the feed pipe is sprayed toward a washing surface (not shown) from the jet 101a of the nozzle body 101 through the inlet 104a and the outlet 103a.

Although the abovementioned conventional washer nozzle 100 is bound by respective clicks 104b and 104c so as not to move in the left and right directions, it is not restricted in the upper and lower directions in FIG. 5 because the washer nozzle 100 is fixed to the vehicle panel 50 by engaging the clicks 104b and 104c provided to the cylindrical part 104 to the respective end walls 50d of the rectangular hole 50c at the nozzle fitting part 50a. Therefore, there is the possibility that the washer nozzle 100 shifts in the upper or lower direction in FIG. 5, and there is a problem since it is impossible to spray the washing agent in the required direction.

SUMMARY OF THE INVENTION

This invention is made in view of the aforementioned problem of the prior art and it is an object to provide a washer nozzle which can be fixed securely on the vehicle body.

The construction of the washer nozzle according to this invention for attaining the aforementioned object is characterized by comprising a cylindrical part provided with an inlet for a washing agent, a nozzle holder provided with an outlet for the washing agent, a nozzle body retained in said outlet for spraying the washing agent, a pair of clicks provided to said cylindrical part and protruding in opposite directions for engaging a vehicle body respectively, and a wedge-shaped projection provided on said cylindrical part and overhanging in a direction intersecting at right angles to the protruding direction of said clicks for being pressed against the vehicle body.

DESCRIPTION OF THE PREFERRED EMBODIMENT

Figure 1:
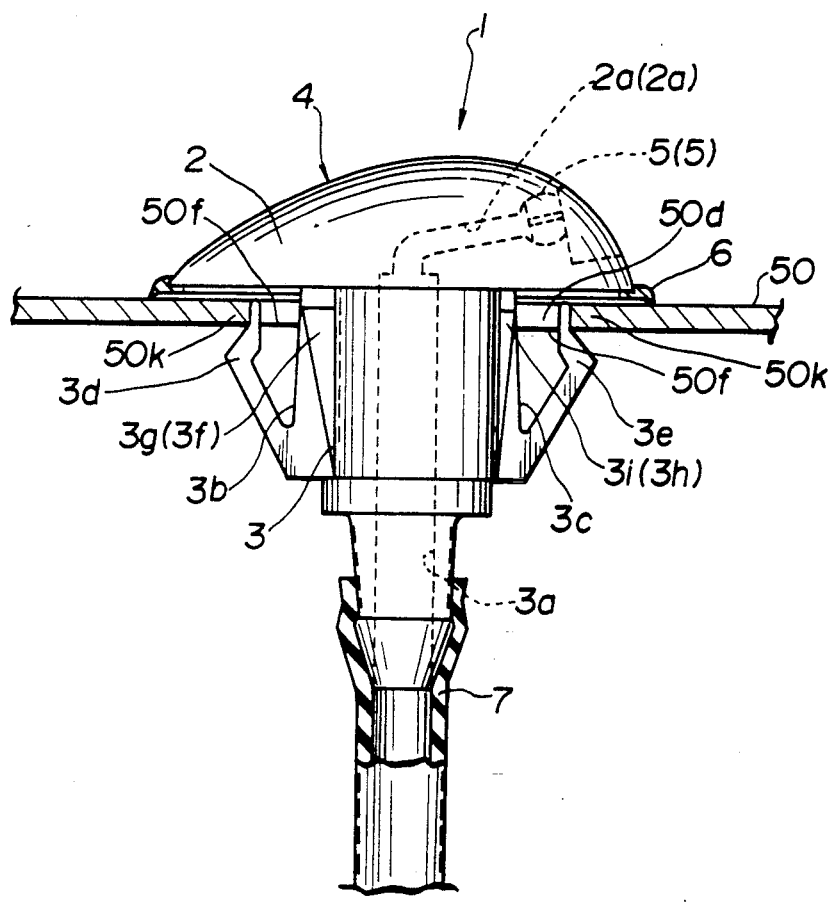
FIG. 1 is a side view of an embodiment of the washer nozzle according to this invention.

A washer nozzle according to an embodiment of this invention will be explained below on basis of FIG. 1 to FIG. 3.

A washer nozzle 1 shown in the figures is provided with an outlet 2a for a washing agent in a nozzle holder 2 of a nozzle case 4, which is constructed from the nozzle holder 2 and a cylindrical part 3 formed as on uniting one piece body with the nozzle holder 2, and a nozzle body 5 is retained in the outlet 2a.

The washer nozzle 1 is also provided with an inlet 3a to be fed with the washing agent which communicates with the outlet 2a in the cylindrical part 3 and has a pipe-like shape and extends downwardly from the nozzle holder 2 in FIG. 1.

Figure 3:
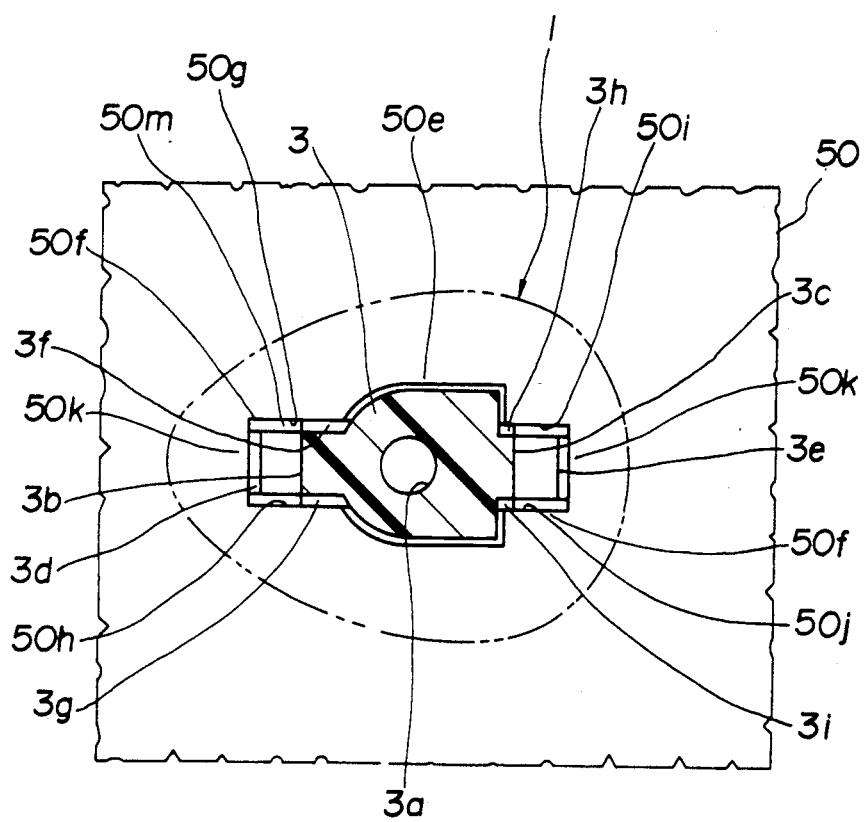
FIG. 3 is a horizontal sectional view at the cylindrical part of the washer nozzle shown in FIG. 1.
Figure 4:
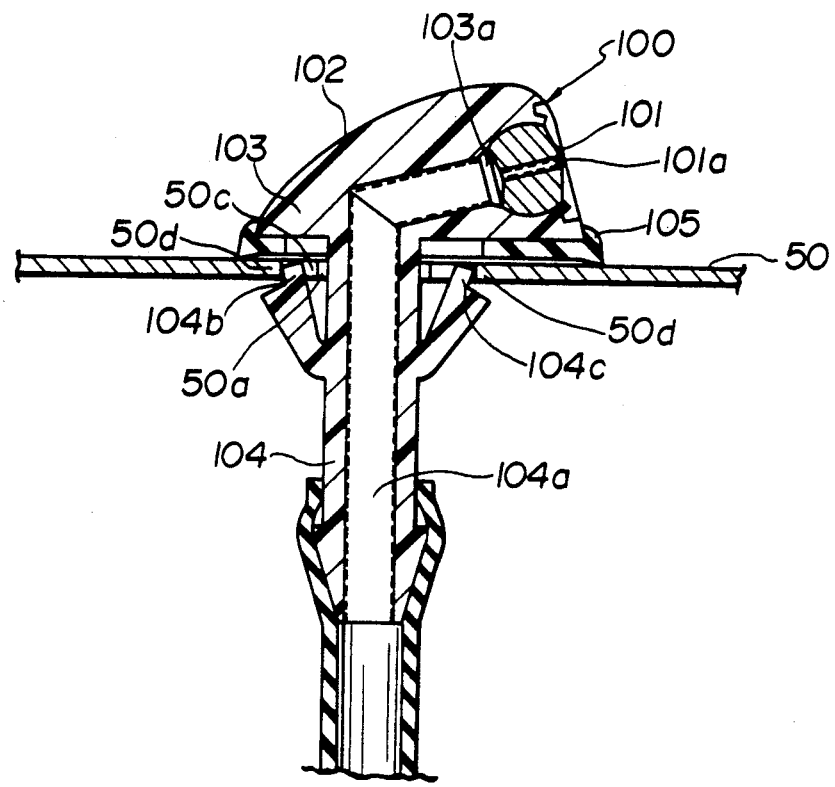
FIG. 4 is a vertical sectional view of the conventional washer nozzle.
Figure 5:
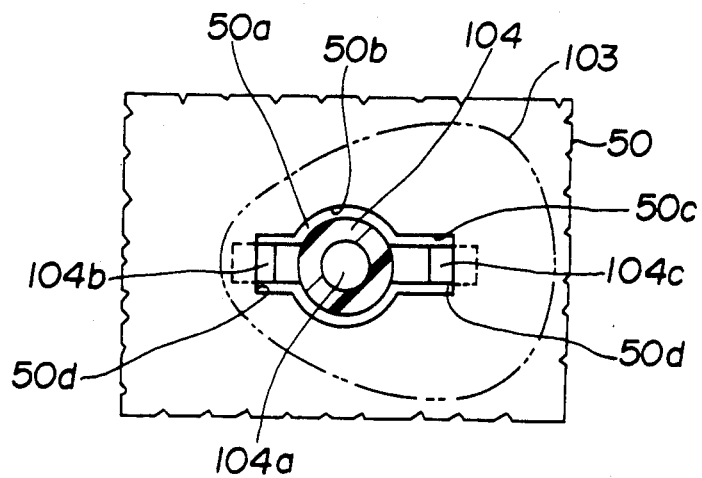
FIG. 5 is a horizontal sectional view at the cylindrical part of the washer nozzle shown in FIG. 4.

The cylindrical part 3 is provided with an inset portion having an asymmetrical cross-section as shown in FIG. 3 and is provided with clicks 3d and 3e protruding left-and-right from both projecting side walls 3b and 3c of the inset portion of the cylindrical part 3 on the left and right sides in figure with the clicks 3d and 3e designed so as to engage to a nozzle fitting part 50m that is an opening cut through the vehicle body 50a having a shape similar to the cross-section of the inset portion of part 3.

Figure 2:
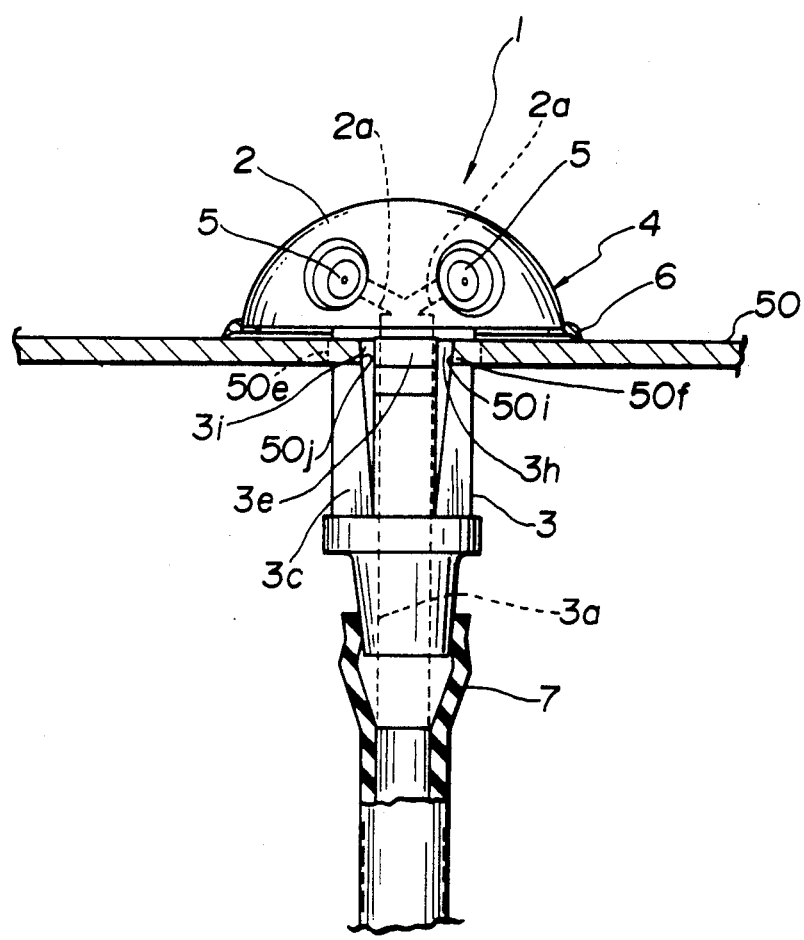
FIG. 2 is a front view of the washer nozzle shown in FIG. 1.

The inset portion of the cylindrical part 3 is also provided with wedge-shaped projections 3f, 3g, 3h and 3i which protrude in wedge-like shape on the opposite flanks of the both side walls 3b and 3c in FIG. 3, that is in the direction intersecting at right angles to the protruding direction of the respective clicks 3d and 3e and are tapered downwardly from the side of the nozzle holder 3 in FIG. 2.

The nozzle fitting part 50m is formed, as shown in FIG. 3, from a center hole 50e having an inner dimensions slightly larger than the outer dimensions of the inset portion the cylindrical part 3 and outside holes 50f extending rectangulaly in the left and right directions in the figure from the center hole 50e, and the inside measurement between the side walls 50g and 50h, or 50i and 50j is designed so as to be slightly smaller than the maximum outside measurement of the inset portion of the cylindrical part 3 including the projections 3f and 3g, or 3h and 3i at the most upper position of the inset portion of the cylindrical part 3.

A rubber damper sheet 6 is fitted on the lower surface of the nozzle holder 2 around the cylindrical part 3 in FIG. 1, and the respective clicks 3d and 3e are engaged to respective end walls 50k of the outside holes 50f by forcing the cylindrical part 3 into the nozzle fitting part 50m from upward to downward in FIG. 1.

By engaging the clicks 3d and 3e to the end walls 50k respectively, the respective projections 3f, 3g, 3h and 3i are pressed against the side walls 50g, 50h, 50i and 50j respectively.

Thereby, the washer nozzle 1 is fixed to the vehicle panel 50 at the state in which the washer nozzle 1 is restricted by the clicks 3d and 3e so as not to move in the left and right directions in FIG. 3 and restricted by the wedge-shaped projections 3f, 3g, 3h, and 3i so as not to move in the upper and lower directions in FIG. 3.

In this state, by feeding the washing agent through a feed pipe 7 connected communicatingly to the inlet 3a of the cylindrical part 3, the washing agent is sprayed toward a washing surface (not shown) from a jet opening in the nozzle body 5 through the inlet 3a and the outlet 2a of the nozzle holder 2.

As mentioned above, the washer nozzle according to this invention is provided with a pair of clicks protruding in the opposite directions for engaging to a vehicle body and a wedge-shaped projection overhanging in the direction intersecting at right angles to the protruding direction of the clicks for being pressed against the vehicle body to a cylindrical part forming a part of the washer nozzle. Therefore, it is possible to fix the washer nozzle on the vehicle body securely because the washer nozzle is restricted on the vehicle body in the directions meeting at right angles each other, and an excellent effect can be obtained since it is possible to maintain the spraying direction of the washing agent in the most suitable state. Additionally, another effect can be obtained in that it makes it easier to set up the washer nozzle on the vehicle body without mistaking the mounting direction of the washer nozzle because the washer nozzle is set by fitting the inset portion of the cylindrical part having the asymmetrical cross-section into the nozzle fitting part cut through the vehicle body in the shape similar to the cross-section of the inset portion.

What is claimed is:

1. A washer nozzle comprising:
   a cylindrical part provided with an inlet for a washing agent and an inset portion with an asymmetrical cross-section about a center axis and oppositely projecting side walls disposed thereon for fitting into a nozzle fitting hole formed on a vehicle body in a shape similar to the cross-section of said inset portion and having rectangular shaped holes extending outwardly from opposite ends of said nozzle fitting hole for receiving said projecting side walls;
   a nozzle holder provided with an outlet for a washing agent;
   a nozzle body retained in said outlet for spraying a washing agent;
   a pair of clicks provided on said projecting side walls and protruding in opposite directions for engagement with end walls of said rectangular holes remote from said nozzle fitting hole of the vehicle body; and
   wedge-shaped projections provided on opposite flanks of said projecting side walls on said inset portion of the cylindrical part and overhanging in a direction intersecting at substantially right angles to the protruding directions of said clicks for being pressed against side walls of said rectangular holes adjacent the nozzle fitting hole of the vehicle body.

* * * * *